United States Patent Office 3,840,599
Patented Oct. 8, 1974

3,840,599
**1,2-DICHLOROPROPIONYL-(4'-CHLORO-2'-NITRO)-
ANILIDE**
Hans Suter and Hans Zuter, Schaffhausen, Switzerland,
assignors to Mundipharma AG, Basel, Switzerland
No Drawing. Continuation-in-part of application Ser. No.
853,526, Aug. 27, 1969, which is a continuation-in-part
of application Ser. No. 649,803, June 29, 1967, now
abandoned. This application May 17, 1972, Ser. No.
253,949
Int. Cl. C07c 103/32
U.S. Cl. 260—562 B          1 Claim

ABSTRACT OF THE DISCLOSURE

Substituted anilides and halogenated phenyl ester having anti-fungal properties, corresponding to the general formulae:

(a)
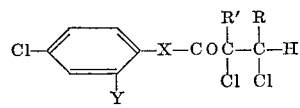

or (b)
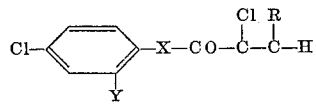

or (c)
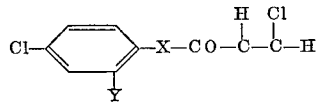

wherein, when X represents the N—R" group, in which R" is a hydrogen atom or a lower alkyl group of from 1 through 4 carbon atoms in chain length, then Y is a chlorine atom or a nitro group and R and R' are either hydrogen atoms or lower alkyl group of from 1 through 4 carbon atoms in chain length, and when X represents an oxygen atom, then Y is a chlorine atom, a nitro group or a hydrogen atom and R and R' are either hydrogen atoms or lower alkyl groups of from 1 through 4 carbon atoms in chain length. The new compounds are prepared by condensing the appropriately substituted aniline with the respective substituted organic acid chloride. The new compounds were found to be active against varieties of fungi and pharmaceutical compositions containing the compounds of the invention are also described.

The present application is a continuation-in-part of Applicant's co-pending Patent Application Ser. No. 853,526, filed Aug. 27, 1969, which in turn, was a continuation-in-part application of Applicant's co-pending Patent Application Ser. No. 649,803, filed June 29, 1967, now abandoned.

The present invention is concerned with the new and novel substituted anilides and halogenated phenyl esters which exhibit a desirable activity against fungi, the method for their preparation, and the method of achieving an anti-fungal action through the application of the aforesaid substituted anilides and/or halogenated phenyl esters to the infected site. In particular, it relates to new substituted anilides and esters of the formulae:

(a)
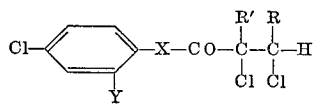

(b)
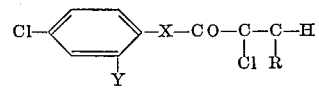

or (c)
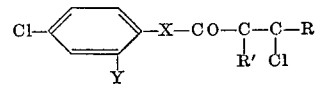

wherein, when X represents the N—R" group, in which R" is a hydrogen atom or lower alkyl group of from 1 through 4 carbon atoms in chain length, then Y is a chlorine atom or a nitro group and R and R' are either hydrogen atoms or lower alkyl group of from 1 through 4 carbon atoms in chain length and when X represents an oxygen atom, then Y is a chlorine atom, a nitro group or a hydrogen atom and R and R' are either hydrogen atoms or lower alkyl group of from 1 through 4 carbon atoms in chain length, the method for the preparation of said compounds and the method for their use as anti-fungal compounds. Furthermore, it relates to pharmaceutical compositions containing aforesaid new substituted anilides and the halogenated phenyl esters whch are useful in the treatment of fungal infections of the skin of humans and animals.

Although recent years have witnessed a tremendous number of new germicidal agents, the continuing need for new anti-fungal agents remain constant since the incidence of mutation and adaptation among micro-organisms is high. Of special interest are those agents which attack the various fungal microspores, epidermophyton and trichophyton.

For some time now such compounds as salicylanilide and generally those of the class of hydroxy-benzanilides have been utilized with good tolerances and relatively high anti-microbial activity in the treatment of certain dermatologic diseases. However, the members of this class of compounds have certain inherent disadvantages which limits their therapeutic utility. Thus, the presence of blood serum with the class of compounds of salicyl anilides reduces the respective anti-microbial activity 50 to 100 times. Furthermore, the aforesaid salicylanilide compounds exhibit only slight antimicrobial activity against a common pathogenic organism, Candida albicans. Another limitation of these phenolic anilide compounds is their sensitivity to oxidation which not only causes a loss in potency but also results in a marked discoloration of pharmaceutical preparations containing these agents. The problem of broad spectrum anti-fungal activity has not been solved by antibiotics, which are known to be generally ineffective against these organisms. While some promise has been indicated by the newer mycostatic antibiotics, these latter agents are not considered to be the answer to the problem of treating dermatologic fungal infections because of problems of noxious side reactions and allergic sensitivities occurring after their use.

In contrast to the properties of the older salicylanilide derivatives, the compounds of the present invention possess potent anti-fungal properties which are not inhibited by the presence of blood serum and which are superior to the known fungistatic high-potency antibiotic compounds. The new compounds, furthermore, possess a prolonged duration of activity and are non-irritating and non-sensitizing to human skin. The respective new compounds may be used to treat fungal infections of susceptible organisms occurring in both humans and animals.

The new anilide compounds have the following general formulae:

(a) 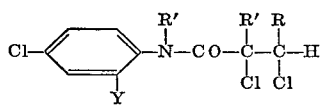

or (b) 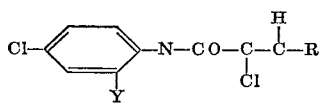

or (c) 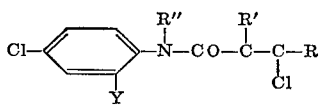

wherein Y represents a chlorine atom or a nitro group and R, R' and R'' are hydrogen atoms or lower alkyl groups. Examples of preferred compounds of this group are:

1,2-Dichloropropionyl-(4'-chloro-2'-nitro)-anilide
1-Chloroacroyl-(4'-chloro-2'-nitro)-anilide
1,2-Dichlorobutyroyl-(4'-chloro-2'-nitro)-anilide
1-Chlorocrotonyl-(4'-chloro-2'-nitro)-anilide
1,2-Dichloropropionyl-(2',4'-dichloro)-anilide
1-Chloroacroyl-(2',4'-dichloro)-anilide
1,2-Dichlorobutyroyl-(2',4'-dichloro)-anilide
1-Chlorocrotonyl-(2',4'-dichloro)-anilide
1,2-Dichloro-1-methyl-acroyl-(2',4'-dichloro)-anilide The new compounds may be prepared by condensing the appropriately substituted aniline with the desired organic acid. It is preferred that the respective acid chloride be used in place of the free acid as the condensing moiety. The reaction may be designated as follows:

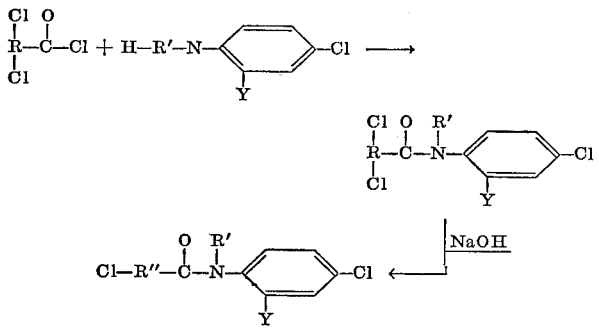

wherein R and R' is a saturated alkyl group of from 1 through 4 carbon atoms in chain length or a hydrogen atom, R'' is an unsaturated alkyl group of from 2 through 4 carbon atoms in chain length and Y is a chloro or nitro group. The formed new anilide is obtained in excellent yield. The corresponding unsaturated compound may be obtained through the removal of hydrochloric acid with alkali, as for example, sodium hydroxide, potassium hydroxide or calcium hydroxide to yield the respective unsaturated compound.

Another convenient method to remove hydrochloric acid is to use controlled heating, and distilling the hydrochloride compound through a glass column. Under certain conditions it may be desired to utilize the appropriately substituted acrylic acid as the condensing agent with the selected aniline compound to directly obtain the unsaturated substituted anilide. In the latter instance, chlorine atoms may be introduced into the side chain to result in a dichloro substituted compound. When such chlorine compounds are desired, the unsaturated intermediate is dissolved in anhydrous alcohol or benzene and chlorine gas bubbled through the mixture until no further increase in weight results. The mixture is then set aside to stand and the solvent distilled. The desired formed product is recrystallized from alcohol, petroleum ether, benzene or ethylacetate.

The method for preparing 1,2-dichloropropionyl-(4'-chloro-2'-nitro)-anilide is an illustration of the above described general procedure. 4'-chloro-2'-nitro aniline and antipyrine are dissolved in chloroform. To the chloroformic solution is added the 1,2-dichloropropionic acid chloride dissolved in a small amount of chloroform and the whole stirred for two hours at room temperature. The solvent is removed by vacuum distillation, the residue treated with ether. The ether layer is separated, dried and concentrated to yield 1,2 - dichloropropionyl-(4'-chloro-2'-nitro)-anilide which melts at 73° to 76° C. and is insoluble in water but soluble in chloroform, glacial acetic and ethylacetate. The 1,2-dichloro derivative described above may be converted to the unsaturated acryloyl derivative by treatment with normal sodium hydroxide solution which removes one mol of hydrochloric acid to form the corresponding unsaturated compound. Utilizing the above described method the compounds of the present invention may be readily prepared in good yield from the respective substituted aniline and organic acid or acid chloride selected.

The corresponding halogenated phenyl propionate esters are prepared by condensing the appropriately halogenated phenol with the appropriate halogen substituted propionic acid. A preferred method is to use the respective acyl chloride of the halogen substituted propionic acid and an alkali metal salt of the appropriately substituted phenol. Thus, for example, when 1,2-dichloropropionic acyl chloride is condensed with sodium-p-chlorophenolate, then p - chlorophenyl-1,2-dihcloropropionate is obtained. If sodium-meta-dichlorophenolate is used in place of the sodium p-chlorophenolate, then the ester 2',4'-dichlorophenyl 1,2-dichloropropionate is obtained. Similarly other substituted propionic acid compounds may be used to condense with the halogenated phenol to result in the respective halogenated phenyl propionate ester, as for example by condensing 1, chloro-2-methoxypropionic acid and sodium - meta - dichlorophenolate will result in 2',4'-dichlorophenyl-1-chloro-2-methoxypropionate. When ortho, para or meta substituted chlorophenols are condensed with a halogenated propionic acid or its acid chloride, then the respective chloronitrophenyl ester is obtained. The substituted phenyl propionate esters are all stable compounds with reproducible properties characteristic for the compound. The esters may be purified by distillation under a vacuum and the respective esters possess the broad anti-fungal, anti-mold, anti-yeast and anti-bacterial properties of the corresponding halogenated propionyl anilides.

The new compounds were found to be potent, antimicrobial compounds against fungi when tested by the well known scientific methods for determining such properties. In a test of the anti-microbial activity of the new compounds, to wit: 1,2 - dichloropropionyl-4'-chloroanilide, 1,2 - dichloropropionyl-2',4'-dichloroanilide, 1,2-dibromopropionyl-2',4'-dichloroanilide and 1,2 - dichloropropionyl-(2'-nitro-4'-chloro)-anilide against *Penicillium notatum*, ATCC 9178; *Aspergillus niger*, ATCC 1004; *Epidermophyton floccosum*, ATCC 9646; *Candida albicans*, ATCC 10231, and air contaminant microbes utilizing the following technique: Ten milligrams of each of the aforesaid agents were dissolved in 2 ml. of ether and mixed with Sabouraud broth to make 100 ml. (1:10,000 dilution). Using a sterile technique with 5 ml. amounts of the aforesaid mixture, dilutions as low as 2 mcg. per ml. of active compound were prepared in Sebouraud broth.

An additional series using 10 ml. amounts of said mixture were placed in plastic Petri dishes (diameter, 60 mm.).

The test organisms were grown on Sabouraud agar for 10 days. Suspensions of the spores of *P. notatum* and *A. niger* were prepared in saline solution having an optical density equal to 25 percent light transmission when measured in a B & I Spectronic-20 instrument. A similar suspension was made of *C. albicans* cells. One-tenth milliliter of the respective microbial suspension was used as the inoculum. Since *E. floccosum* did not exhibit spore formation small portions (2 mm. square) of the mycelium were removed with a sterile razor blade and used as the inoculum. To determine the activity of the agents against common air contaminating fungi, the covers of the petri dishes were removed for one hour on each of three successive days to expose the culture medium to the air. All fungal spores falling into the various dilutions would either be inhibited, or not, according to the particular agents germicidal activity. In the latter experiment no attempt was made to identify any of the contaminants growing in the culture medium but it would appear from a superficial observation that they were of the genus Penicillium. Incubation was at 25° C. for seven days. The anti-microbial activity of all of the test compounds was within the same range and the minimum inhibitory concentration for the class of new compounds was determined to be between 1:100,000 and 1:500,000 (10 mcg. and 2 mcg. per ml.).

In another test of the anti-microbial properties of the respective new compounds, to wit, 1,2-dichloropropionyl-4' - chloroanilide, 1,2 - dichloropropionyl-2',4'-dichloroanilide and 1,2-dibromopropionyl-2',4'-dichloroanilide, to determine their minimum inhibitory concentrations against *Staphylococcus aureus* and *E. coli* organisms utilizing a brain-heart infusion broth medium, it was established that the minimum inhibitory concentration for the aforesaid compounds was at a concentration of active ingredient of between 1:10,000 and 1:100,000 per ml.

In still another test of germicidal potency, 1,2-dichloropropionyl-(4'-chloro-2'-nitro)-anilide was studied for its effect on such organisms as *Penicillium notatum*, AT 9178, *Aspergillus niger*, ATCC 1004, *Epidermophyton floccosum*, ATCC 9646 and *Candida albicans*, ATCC 10231, utilizing the conventional petri dish technique with Sabouraud medium. It was found that the minimum inhibitory concentrations of the aforesaid compound to prevent growth of the respective organisms was between 2 mcg. and 20 mcg. per ml.

In still another test, the minimum inhibitory concentration of 1,2-dichloropropionyl-(4'-chloro-2'-nitro)-anilide was determined against the spore, *Microsporum canis*, ATCC 10214, using Sabouraud liquid medium according to the method described by the Association of Official Agricultural Chemists. The fungicidal test potency of the compound studied was measured against approximately 5 million spores per ml. After incubation at 25° C. for 10 days, the minimum inhibitory concentration of 1,2-dichloropropionyl-(4'-chloro - 2' - nitro)-anilide was determined to be between 0.5 mcg. and 1.0 mcg. per ml.

When the new compounds are incorporated with a pharmaceutically acceptable carrier, a similar degree of desirable anti-microbial properties are observed. Agar-media petri dishes were prepared with either Trypticase Soy Agar, B.B.L., and Sabouraud Agar, B.B.L., and the surface inoculated with each of the organisms shown in Table I below. Two grams of a test sample were then planted, in duplicate, on the respective agar surfaces. The test samples consisted of 1,2-dichloropropionyl-(4'-chloro-2'-nitro)-anilide, which was studied at both the 0.1 percent concentration in a pharmaceutically acceptable ointment base, with the placebo base-carrier serving as the control sample. After incubation, the growth of micro-organisms in the medium was measured for zones of inhibition surrounding the test sample. The measurements were made from the edge of the test sample to the margin of growth observed.

TABLE I.—ZONE OF INHIBITION
[In mm.]

| Organism | Control sample | Sample 1, 0.1% conc. | Sample 2, 1.0% conc. |
|---|---|---|---|
| *P. ovale* | 0 | 5 | 11 |
| *C. albicans* | 0 | 3 | 8 |
| *A. niger* | 0 | 2 | 4 |
| *P. notatum* | 0 | 3 | 7 |
| *T. mentagrophytes* | 0 | 6 | 11 |

The above studies of the germicidal properties of the new compounds conclusively establish their desirable antiseptic properties. The corresponding phenylpropionate esters similarly exhibited a desirable range of microbicidal properties under the same test conditions and consequently provide a new range of germicidal utility in both environmental antiseptic practice and in therapy of humans and animals.

When it is desired to utilize the new compounds either in the treatment of a dermatologic fungal infection, then the desired new compound may be applied to the infected area from one to six times daily. The selected new compound may be applied directly or combined with a pharmaceutically acceptable carrier. In view of the effective antimicrobial properties of the respective new compounds, the concentration of the selected active ingredient may be as low as 100 parts per million, when used in the therapy of microbial infections of the skin of humans and animals. Because of their unique non-sensitizing, and non-irritating properties, the new compounds may be used in concentrations as high as 10 percent in a suitable carrier to combat the more resistant infestations, or even by the direct application of the active substance for special purposes.

In practice however, it will generally be found desirable to utilize a range of concentration of the selected active ingredient from between 0.1 percent to 10 percent when treating dermatologic disease of humans and animals, depending upon the severity of the disease and the type of pharmaceutically acceptable carrier employed. Thus, when an oleaginous ointment base is used as the carrier, it will require the higher range of concentration of active ingredient particularly when used to treat a resistant infection. The lower range in concentration of active ingredient will be employed when a hydroalcoholic carrier is used in therapy.

When it is desired to use a pharmaceutically acceptable carrier in combination with the selected active compound, then the broad range of pharmaceutically acceptable vehicles as are known to dermatologic pharmacy may be employed, as for example, lotions, ointments, emulsions, creams, solutions, suspensions and powders. For certain dosage forms, as for example, emulsions, solutions, suspensions and powders, as aerosol dispensing techniques may be employed utilizing either Freon, nitrogen or any other suitable inert propellants. Because of the unique stability and compatibility of the new anilide derivatives and the new halogenated phenyl esters, the particular selection of the pharmaceutically acceptable vehicle to be used with the preferred active ingredient is dependent only on the patient's needs and the degree of the desired antimicrobial effect required.

In the therapy of dermatologic infections of humans and animals, it will be preferred to utilize a pharmaceutical composition comprising from 0.1 percent to 10 percent by weight of the selected new compound as the active ingredient and a pharmaceutically acceptable carrier. Examples of pharmaceutically acceptable carriers which may be employed for such purposes are alcohols of the formula ROH, wherein R represents an alkyl group of from 1 to 5 carbon atoms in chain length, glycerine, propylene glycol, polyoxyethylene glycol, having a molecular weight of from 200 to 800, acetone, water and mixtures of the same. Solid pharmaceutically acceptable carriers may also be employed, as for example, talc, starch, kaolin, polyoxyethylene glycols, having a molecular weight of from 1,000 to 6,000, cocoa-butter, petrolatum, and mixtures of the same, as well as compounded ointment bases as hydrophylic petrolatum, hydrophilic ointment base and cold cream. In certain instances, it may be desirable to utilize an aerosol dosage form in which case, the active ingredient may be dissolved in the propellant as for example, Freon, or a pharmaceutically suitable liquid solvent, as described above, may be utilized with nitrogen gas as the propellant.

The liquid dosage forms are prepared by dissolving appropriate concentrations of the active ingredient in three fourths the volume of the selected pharmaceutically acceptable liquid carrier, described above, which may be a single substance or a mixture, and then the whole brought to proper volume by the addition of increments of the selected solvent. In some instances, the active material may be insoluble in the selected solvent, in which case, a dispersion is prepared utilizing equal parts of active ingredient and carrier which is then added to approximately three fifths of the desired volume of the finished preparation of the vehicle selected and the whole homogenized. The dispersion is then brought to proper volume of additional vehicle and passed through the homogenizer once again. Should it be desired to add suspending agents, then these should be added before the batch volume is brought to final quantity. When solid compositions are prepared these may be manufactured through the process of levigation. This is preferred when ointments and pastes are manufactured. An alternate procedure to use with carriers capable of being liquified is to melt the carrier and to suspend the active ingredient therein. The mixture is stirred to achieve a uniform dispersion and then cooled to room temperature. When solid powders are intended these may be prepared through direct intimate mixing of the proper quantities of active ingredient with the solid powder carrier.

When used to treat dermatologic microbial infection, pharmaceutically acceptable compositions containing from 0.1 percent to 10 percent of the new compounds are preferred and such preparations are applied to the affected area from 1 to 6 times daily, depending upon the severity of the disease and the susceptibility of the invading organism. The particular pharmaceutical composition to be used will further depend upon the body area to be treated. Thus it may be desirable to utilize an aerosol spray to bring the active ingredient into contact with an invading organism if those body areas are difficult to reach in the ordinary manner. Convenience of use may also be a factor in the selection of a dosage form. Ointments are particularly preferable for those areas wherein friction or irritation is present, as for example, in tissue-folds or between the digits. Solutions may be utilized for the long planer body surfaces and powders for those body regions wherein a drying effect is desired.

EXAMPLE 1

To 17.25 g. of 4-chloro-2-nitro-aniline dissolved in 200 ml. of chloroform is added 20 gm. of antipyrine. The mixture is stirred, and when all of the solid material has dissolved the solution is cooled to 0° C. and 17.5 g. of 1,2-dichloropropionic acid chloride dissolved in 20 ml. chloroform is added. The mixture is vigorously stirred for a period of at least one hour and then allowed to warm to room temperature. The solvent is removed by vacuum distillation and the residue treated with 50 ml. of ice water and then 50 ml. of ether. The ether-water layers are thoroughly mixed, allowed to separate and the water layer discarded. The ether portion is dried and the ether evaporated. 1,2-dichloropropionyl-(4'-chloro-2'-nitro)-anilide is obtained in approximately 80–85 percent yield and may be recrystallized from isopropanol. The compound melts at 73°–76° C.; is insoluble in water but soluble in chloroform, glacial acetic acid and ethyl acetate.

EXAMPLE 2

To 50 ml. of N Sodium hydroxide is added 15 g. of 1,2-dichloropropionyl-(4' - chloro-2'-nitro)-anilide suspended in 30 ml. of water. The mixture is stirred for at least 30 minutes and filtered. The solid material is washed with water and dried. The resulting 1-chloroacroyl-(4-chloro-2'-nitro)-anilide melts at 87°–88° C. and is insoluble in acetone, ethyl acetate, chloroform and at lower alkanols.

EXAMPLE 3

In place of 4-chloro-2-nitro aniline described in Example 1 may be substituted to 2,4-dichloro-aniline. The remainder of the steps remain the same and the resultant compound is 1,2-dichloropropionyl and (2',4'-dichloro)-aniline. By treatment with sodium hydroxide as described in Example 2, 1,2-dichloropropionyl-(2',4'-dichloro)-aniline may be converted to 1-chloroacroyl-(2',4'-dichloro)-aniline in good yield.

EXAMPLE 4

In place of the 1,2-dichloropropionic acid chloride described in Example 1 may be substituted an alkyl acid chloride selected from the group consisting of 1,2-dichlorobutyric acid chloride, 1-chloro-acrylic acid chloride, and 1-chloro-crotonic acid chloride. The remainder of the steps being the same and the respective compounds, to wit, 1,2-dichlorobutyroyl-(4'-chloro-2'-nitro)-anilide, 1-chloroacryloyl-(2'-nitro-4'-chloro)-anilide and 1-chlorocrotonyl-(2'-nitro-4'-chloro)-anilide are obtained in good yield.

EXAMPLE 5

In place of the 1,2-dichloropropionic acid chloride used in Example 3 may be substituted 1,2-dichlorobutyric acid chloride or 1,2-dichloromethyl propionic acid chloride. The respective compounds 1,2-dichlorobutyroyl-(2',4'-dichloro)-anilide and 1 - chlorocrotonyl-(2',4' - dichloro)-anilide are obtained in good yield. The corresponding unsaturated compound is obtained by treatment with sodium hydroxide as described in Example 2 above, to yield 1-chlorocrotonyl-(2',4'-dichloro)-anilide and 1-chloromethylacroyl-(2',4'-dichloro)-anilide.

EXAMPLE 6

Should it be desired to prepare the respective unsaturated substituted anilides directly, then the appropriate unsaturated starting reagent acid chloride as for example, 1-chloroacrylic acid chloride, 1-chlorocrotonic acid chloride or 2-chloro-1-methylacrylic acid is added to a solution of 2-4-dichloro-aniline dissolved in pyridine and the mixture stirred. The pyridine is evaporated and the residue extracted with ice water and ether. The ether layer is separated, dried and evaporated to yield the corresponding unsaturated 2',4'-dichloro-aniline derivative, 1-chloroacroyl-(2',4'-dichloro)-anilide, 1-chlorocrotonyl-(2',4'-dichloro)-anilide, and 2-chloro - 1 - methyl-acroyl-(2,4'-dichloro)-anilide. If 4-chloro-2-nitro aniline is substituted for the 2-4-dichloro aniline, as described above, then the respective 4'-chloro-2'-nitro substituted anilides, to wit, 1-chloroacroyl-(4'-chloro-2'-nitro)-anilide and 1-chlorocrotonyl-(4'-chloro-2'-nitro)-anilide, are formed.

EXAMPLE 7

To one tenth mol of 1,2-dichloropropionic acid chloride dissolved in toluene is added one tenth mol sodium-p-chlorophenolate. The mixture is vigorously stirred and decomposed with crushed ice. The toluene layer is separated, washed with water and evaporated under reduced pressure. The residue is distilled in vacuum to yield p-chlorophenyl-1,2-dichloropropionate, b.p. 143° at 3 mm./Hg.

EXAMPLE 8

In place of the sodium-p-chlorophenolate used in Example 7 above may be substituted sodium-meta-dichlorophenolate. The remainder of the steps being the same and the 2'-4'-dichlorophenyl-1-2-dichloropropionate obtained in good yield. The compound melts at 33°–34° C. and is insoluble in water but soluble in chloroform, alcohol and ether.

EXAMPLE 9

In place of the 1-2-dichloropropionic acid chloride described in Examples 7 and 8 may be substituted 1-chloroacrylic acid chloride. The remainder of the steps being the same and the respective 1-chloroacrylate derivatives are obtained. 2',4'-dichlorophenyl-1-chloroacrylate melts at 65°–67° C. and is insoluble in water but soluble in isopropyl alcohol, toluene, ether and chloroform. When sodium-p-chlorophenolate is used then p-chlorophenyl-1-chloroacrylate is obtained.

EXAMPLE 10

In place of sodium-p-chlorophenolate, used in Example 7 and Example 9 may be substituted sodium-2-nitro-4-chlorophenolate. The remainder of the steps being the same and the respective 2'-nitro-4'-chlorophenyl-1-2-dichloropropionate, melting at 46°–47° is obtained and when 1-chloroacrylic acid chloride is used as the reagent then 2'-nitro-4'-chlorophenyl-1-chloroacrylate results. The latter compound being insoluble in water and soluble in alcohol and benzene.

EXAMPLE 11

In place of the 1,2-dichloropropionic acid chloride used in Example 1 above, there may be substituted 1-chloro-2-methoxy-propionic acid chloride, 1-methyl-propionic acid chloride or 1-methylacrylic acid chloride. The remainder of the steps are the same and the following substituted 2-nitro-4-chloro-anilides are obtained.

1-Chlorocrotonyl-(4'-chloro-2'-nitro)-anilide,
1,2-Dichloropropionyl-(2'-nitro-4'-chloro)-anilide,
1-Chloroacroyl-(2'-nitro-4'-chloro)-anilide,
1,2-Dichlorobutyroyl-(2'-nitro-4'-chloro)-anilide,
1-Chlorocrotonyl-(2'-nitro-4'-chloro)-anilide,
1,2-Dichloro-1-methyl-propionyl-(2'-nitro-4'-chloro)-anilide,
2-Chloro-1-methylacroyl-(2',4'-dichloro)-anilide,
p-Chlorophenyl-1,2-dichloropropionate,
2',4'-Dichlorophenyl-1-2-dichloropropionate,
2',4'-Dichlorophenyl-1-chloroacrylate,
2'-Nitro-4'-chlorophenyl-1,2-dichloropropionate,
2'-Nitro-4'-chlorophenyl-1-chloroacrylate, and mixtures of the same combined with a pharmaceutically acceptable liquid carrier in the form of a solution or a dispersion are useful to treat fungal, mold and yeast infections of the skin of humans and animals. The aforesaid pharmaceutically acceptable liquid carrier may be either a single liquid substance, as for example an alcohol of the formula ROH wherein R represents an alkyl group of from 1 through 5 carbon atoms in chain length, glycerine, propylene glycol, polyoxyethylene glycol having a molecular weight of from 200 to 800, acetone, water or mixtures of the same, or a compounded pharmaceutically acceptable lotion formulation as for example, calamine lotion, U.S.P., or bentonite lotion. Liquid emulsions either of the hydrophilic, oil-in-water type, or a lipophilic emulsion of the water-in-oil type may be used as carriers for the active ingredient.

In preparing such liquid pharmaceutically acceptable dosage forms containing the new compounds, a concentration of from 0.1 percent to 10 percent of the active ingredient (w./v.) is used. The appropriate quantity of

| Compound (structural formula) | Formula | Mol. wt. | Melting point, °C. |
|---|---|---|---|
| 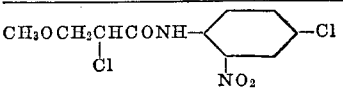 | $C_{10}H_{10}Cl_2N_2O_4$ | 293, 11 | 61–62 |
| 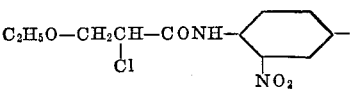 | $C_{11}H_{12}Cl_2N_2O_4$ | 307, 14 | 68–69 |
| 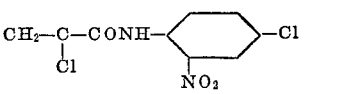 | $C_9H_6Cl_2N_2O_3$ | 261, 07 | 87–88 |
| 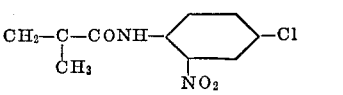 | $C_{10}H_9ClN_2O_3$ | 240, 65 | 100–101 |
| 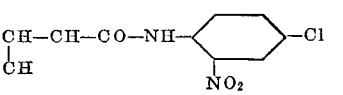 | $C_{10}H_9ClN_2O_3$ | 240, 65 | 157–158 |
| 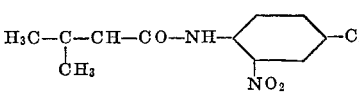 | $C_{11}H_{11}ClN_2O_3$ | 254, 68 | 128–129 |

EXAMPLE 12

In place of the 2-nitro-4-chloro-aniline used in Example 11 may be substituted the compound 2,4-dichloro-aniline and the corresponding 2-4-dichloro-anilides of the compounds listed in Example 1 above are obtained.

EXAMPLE 13

Liquid pharmaceutical compositions comprising a compound described in Examples 1 through 12 above or a compound selected from the group consisting of:

1,2-Dichloropropionyl-(4'-chloro-2'-nitro)-anilide,
1-Chloroacroyl-(4'-chloro-2'-nitro)-anilide,
1,2-Dichlorobutyroyl-(4'-chloro-2'-nitro)-anilide, active ingredient is mixed with an equal volume of the selected carrier and said mixture is added to approximately 90 percent of the volume of the batch being prepared. If a solution is desired, then gentle heat may be utilized to assist the dissolving of the active ingredient. The mixture is stirred until a uniform distribution of desired active substance results and then the total batch is brought to proper volume by the further addition of the carrier selected.

Should it be desired to prepare an aerosol spray of the new compound, then a solution of the active material in a liquid alcohol, as for example, an alcohol of the formula ROH wherein R is an alkyl group of from 1 to 5 carbon atoms in chain length and the whole packaged in a proper aerosol container under pressure. The propellant may be Freon or nitrogen or any other stable inert propellant as it is known to the art. The active ingredient may also be dissolved directly in the Freon propellant thus obviating the needs for an additional solvent.

The pharmaceutically acceptable liquid compositions described above are stable under the usual conditions of storage and exhibit an optimal range of microbicidal activity against fungi, as well as the sporulating forms of the aforesaid organism.

When the new preparations are used to treat a fungal infection of the skin of an animal or human, then it is preferred that the new liquid therapeutic composition be applied to the affected skin surface from 1 to 6 times daily. A prompt remission of infection will be observed within two to three days.

EXAMPLE 14

Solid and semi-solid pharmaceutical compositions comprising a compound described in Examples 1 through 12 above, or a compound selected from the group consisting of:

1,2-Dichloropropionyl-(4'-chloro-2'-nitro)-anilide,
1-Chloroacroyl-(4'-chloro-2'-nitro)-anilide,
1,2-Dichlorobutyroyl-(4'-chloro-2-nitro)-anilide,
1-Chlorocrotonyl-(4'-chloro-2'-nitro)-anilide,
1,2-Dichloropropionyl-(2'-nitro-4'-chloro)-anilide,
1-Chloroacroyl-(2'-nitro-4'-chloro)-anilide,
1,2-Dichlorobutyroyl-(2'-nitro-4'-chloro)-anilide,
1-Chlorocrotonyl-(2'-nitro-4'-chloro)-anilide,
1,2-Dichloro-1-methyl-propionyl-(2'-nitro-4'-chloro)-anilide.
2-Chloro-1-methyl-acroyl-(2',4'-dichloro)-anilide,
p-Chlorophenyl-1,2,-dichloropropionate,
2',4'-Dichlorophenyl-1-2-dichloropropionate,
2_,4'-Dichlorophenyl-1-chloroacrylate,
2'-Nitro-4'-chlorophenyl-1-2-dichloropropionate,
2'-Nitro-4'-chlorophenyl-1-chloroacrylate, and mixtures of the same, combined with a pharmaceutically acceptable solid carrier as for example, starch, talc, kaolin, or waxes, as for example, carnauba wax, paraffin wax, beeswax, or polyoxyethylene glycol having a molecular weight of from 1,000 to 6,000, or polyvinylpyrrolidone and mixtures of the aforesaid solid carriers, may be used to treat dermatologic infections of mold, yeast and fungi occurring in humans and animals. The aforesaid pharmaceutically acceptable solid carrier may either be a single substance as for example, talc, or kaolin or a combination of substances, as for example, spermaceti, 5 per cent, petrolatum, 95 percent, or a commercially available pharmaceutical solid ointment carrier as for example, hydrophilic petrolatum, cold cream, or any of the other dermatologic pharmaceutical bases. The new compounds will be found to be stable in admixture with these solid carriers and the new compositions thus formed are effective anti-microbial substances against mold, yeast and fungi as well as certain species of bacteria, to wit, *Staph. aureus* and *E. coli*. The effective concentration to be used in therapy will depend upon the individual patient's need, the specific organism to be treated and the form of the organism to be treated, that is, whether it is in the spore form or the viable active state, and will generally range from between 0.1 percent to 10 percent of the active ingredient. While the range in concentration of from 0.1 percent to 10 percent may appear to be large, this is not an inordinate dosage span, when the customary practice of therapy with topically active substances is considered. The clinician is well versed in the art of selecting the proper concentration to meet his patient's needs. Furthermore, in view of the broad spectrum of activity against the entire genus of fungi, it is not necessary to specifically elaborate the particular organism to be destroyed, although such organisms as *P. ovale, C. albicans, A. niger, P. notatum, T. mentagrophytes* are particularly susceptible to the new compounds and compositions containing the same.

The new compositions are prepared by mixing the appropriate quantity of the selected active ingredient with the desired carrier. Simple levigation may be used but the more sophisticated methods of manufacture such as comminution, mechanical tumbling and milling may also be employed, if desired. The purpose of the particular mixing technique utilized in the manufacture of the aforesaid solid compositions is to achieve a uniform distribution of the active substance throughout the carrier.

When it is desired to employ these new solid compositions in therapy of fungi infections of humans and animals, then the desired preparation containing a therapeutically effective concentration of active ingredient of from 0.1 percent to 10 percent by weight, is applied to the affected area, 1 to 6 times daily. A covering over the medication need not be employed. Beneficial results will be observed after a period of one week of therapy even in the more resistant cases.

When it is desired to treat a fungal infection of the scalp, the new compounds may be applied from 1 to 6 times daily, and the hair and scalp shampooed at least three times weekly. Application of medication should be instituted immediately after each shampooing of the hair and scalp.

It may be desired to utilize the solid dosage form of an aerosol powder spray and these are prepared by mixing the active ingredient with a pharmaceutically acceptable aerosol carrier, as for example, talc or starch together with a propellant which may be Freon or nitrogen gas and packaged in specifically designed aerosol containers utilized for these preparations. The mixture of active ingredient and carrier is first prepared using any of the techniques of mixing described above, and then packaged into the suitable containers with the pressurized propellant.

What is claimed is:
1. The compound 1,2-dichloropropionyl-(4'-chloro-2'-nitro)-anilide.

References Cited
UNITED STATES PATENTS

| | | | |
|---|---|---|---|
| 3,418,345 | 12/1968 | Baker | 260—562 |
| 3,395,174 | 7/1968 | Knell et al. | 260—886 |
| 3,227,542 | 1/1966 | Kurtz et al. | 260—486 |
| 2,957,800 | 10/1960 | Hopkins | 260—562 |
| 3,151,158 | 9/1964 | Schmitt et al. | 260—562 |

HARRY I. MOATZ, Primary Examiner

U.S. Cl. X.R.

260—479 S; 424—311, 324